(12) United States Patent
Worgt et al.

(10) Patent No.: US 9,943,888 B2
(45) Date of Patent: Apr. 17, 2018

(54) METHOD FOR REMOVING SOLIDIFIED INK OR VARNISH USING ADHESIVE STRIPS

(71) Applicant: HEIDELBERGER DRUCKMASCHINEN AG, Heidelberg (DE)

(72) Inventors: Silvia Worgt, Karlsruhe (DE); Jessica Gioia, Herxheim (DE); Matthias Schloerholz, Plankstadt (DE); Heiner Pitz, Weinheim (DE)

(73) Assignee: Heidelberger Druckmashinen AG, Heidelberg (DE)

( * ) Notice: Subject to any disclaimer, the term of this patent is extended or adjusted under 35 U.S.C. 154(b) by 203 days.

(21) Appl. No.: 14/670,762

(22) Filed: Mar. 27, 2015

(65) Prior Publication Data

US 2015/0273539 A1 Oct. 1, 2015

(30) Foreign Application Priority Data

Mar. 27, 2014 (DE) .......................... 10 2014 004 363

(51) Int. Cl.
| | |
|---|---|
| *B08B 7/04* | (2006.01) |
| *B08B 7/00* | (2006.01) |
| *B44D 3/16* | (2006.01) |
| *C09D 9/00* | (2006.01) |

(52) U.S. Cl.
CPC .......... *B08B 7/0028* (2013.01); *B08B 7/0014* (2013.01); *B44D 3/16* (2013.01); *C09D 9/00* (2013.01)

(58) Field of Classification Search
CPC ....................................................... B41F 35/02
See application file for complete search history.

(56) References Cited

U.S. PATENT DOCUMENTS

| | | | |
|---|---|---|---|
| 6,432,211 B1 * | 8/2002 | Schmitt .................. | B41N 3/06 101/423 |
| 8,752,228 B2 | 6/2014 | Farkas et al. | |
| 2002/0112300 A1 | 8/2002 | Muhr-Sweeney | |
| 2009/0020031 A1 * | 1/2009 | Pasuch ................... | B41F 35/02 101/424 |

(Continued)

FOREIGN PATENT DOCUMENTS

| | | |
|---|---|---|
| CA | 978822 A1 | 12/1975 |
| DE | 2223512 A1 | 11/1972 |

(Continued)

*Primary Examiner* — Mikhail Kornakov
*Assistant Examiner* — Ryan L. Coleman
(74) *Attorney, Agent, or Firm* — Laurence A. Greenberg; Werner H. Stemer; Ralph E. Locher

(57) ABSTRACT

A method for removing solidified ink or varnish from a surface includes applying a cleaning agent to the ink on the surface. The cleaning agent applied to the ink on the surface is substantially solvent-free and water-based and reduces adhesion between the ink and the surface without dissolving the ink. An adhesive side or face of a single-sided or single face adhesive element is applied to the surface. As the adhesive element is removed from the surface, the ink that has been treated with the cleaning agent but is undissolved adheres to the adhesive element and is thus removed from the surface together with the adhesive element without splitting.

11 Claims, 2 Drawing Sheets

(56) References Cited

U.S. PATENT DOCUMENTS

| | | | | |
|---|---|---|---|---|
| 2009/0056578 A1* | 3/2009 | De Joseph | ............ | B41C 1/1066 |
| | | | | 101/451 |
| 2012/0103212 A1* | 5/2012 | Stowe | .................. | B41C 1/1041 |
| | | | | 101/147 |
| 2014/0274855 A1 | 9/2014 | Schumann et al. | | |
| 2015/0042716 A1 | 2/2015 | Beier et al. | | |

FOREIGN PATENT DOCUMENTS

| | | |
|---|---|---|
| DE | 102012006371 A1 | 7/2012 |
| EP | 1875490 B1 | 1/2011 |
| JP | 2001353856 A | 12/2001 |
| WO | 2009037349 A2 | 3/2009 |

\* cited by examiner

METHOD FOR REMOVING SOLIDIFIED INK OR VARNISH USING ADHESIVE STRIPS

CROSS-REFERENCE TO RELATED APPLICATION

This application claims the priority, under 35 U.S.C. § 119, of German Patent Application DE 10 2014 004 363.0, filed Mar. 27, 2014; the prior application is herewith incorporated by reference in its entirety.

BACKGROUND OF THE INVENTION

Field of the Invention

The invention relates to a method for removing solidified ink or varnish from a surface of an object in which a cleaning agent is applied to the ink on the surface.

Known methods for removing layers of solidified ink or varnish rely on the use of a solvent, generally subjecting the surface to stress. In order to effectively remove layers of ink, in most cases, the surface is additionally subjected to rubbing or scrubbing. That may damage the surface or result in undesired surface changes. Moreover, that process only removes the layer of ink bit by bit. In addition, small bits of ink may be created that in turn stick to the surface and need to be removed in a time-consuming second cleaning step. A process of removing layers of ink of that kind has turned out to be difficult, in particular for strongly or greatly curved surfaces.

European Patent EP 1 875 490 B1, corresponding to U.S. Pat. No. 8,752,228, discloses a device for cleaning circuit substrates. In one embodiment of that invention, the circuit substrate is passed through a gap between two rollers, each of which presses a cleaning web formed of a carrier web and a cleaning tissue onto the surface of the circuit substrate. Initially, a cleaning liquid is applied either to the surface of the circuit substrate or to the cleaning tissue. The rollers guide the cleaning tissue over the surface of the circuit substrate and the cleaning tissue removes contamination in the form of foreign particles from the surface, absorbs them, and carries them away. In a further embodiment, the cleaning tissue carries an adhesive material. The adhesive material and the material of the carrier web are selected to ensure that adhesion between the carrier web and the adhesive material is greater than adhesion between the adhesive material and the surface of the circuit substrate. During the cleaning process, there is no relative movement between the circuit substrate and the cleaning web. The rollers successively press a new section of the cleaning web onto parts of the surface of the circuit substrate until the entire surface has been treated. In that process, the foreign particles stick to the adhesive surface of the cleaning web.

Japanese Patent Application JP 2001 353 856 A discloses an adhesive sheet for removing solvent-containing substances from surfaces. The adhesive sheet is formed of a base material and an adhesive layer, which is applied to at least one surface of the base material. The adhesive sheet is immersed in the solvent contained in the substance to be removed for three minutes and the adhesive layer absorbs at least 20 g/m² of the solvent.

SUMMARY OF THE INVENTION

It is accordingly an object of the invention to provide a method for removing solidified ink or varnish using adhesive strips, which overcomes the hereinafore-mentioned disadvantages of the heretofore-known methods of this general type and which represents an improvement for removing solidified ink from surfaces, in particular from curved surfaces.

With the foregoing and other objects in view there is provided, in accordance with the invention, a method for removing solidified ink or varnish from a surface of an object. The method comprises applying a cleaning agent to the ink on the surface, the cleaning agent applied to the ink on the surface being substantially solvent-free, water-based and reducing adhesion of the ink to the surface without dissolving the ink, applying an adhesive side of a one-sided adhesive element to the surface, and removing the adhesive element from the surface together with the ink having been treated with the cleaning agent but being substantially undissolved and adhering to the adhesive element without splitting.

On one hand, the method of the invention for removing solidified ink or varnish is suitable for cleaning printed objects that have been provided with ink or varnish, for instance auto body parts. On the other hand, the method may be applied specifically to remove defined areas of a layer of ink irrespective of their shape and size. In the context of the present invention, for reasons of linguistic simplicity, ink and varnish will be commonly referred to as "ink," i.e. the term ink is understood to include varnish.

In order to remove ink, a cloth is used to apply a thin film of a substantially solvent-free, water-based cleaning agent to the region or part of a solidified layer of ink that is to be removed. This cleaning agent permeates the layer of ink to undermine the layer of ink, reducing adhesion of the layer of ink to the surface without dissolving the ink. A preferred cleaning agent is a cleaning agent manufactured by Bubbles and Beyond GmbH, Leipzig (DE), for example a product referred to as IF07. After a residence time of up to three minutes, an adhesive film is applied to and preferentially pressed onto the treated part of the layer of ink. This adhesive film is preferentially removed immediately after application. Substantially the entire treated layer of ink adheres to the adhesive film. The surface part that has been treated in this way is freed from the layer of ink without any residues. The ink layer has not been split. If the ink had been partially dissolved, splitting of the layer of ink would be expected to occur, resulting in an incomplete removal in contrast to the present invention.

The ink may previously have been printed onto the surface of an object in an inkjet printing process. The surface may be a curved surface and the print head may be moved by a robot or the like as described, for example, in German Patent Application DE 10 2012 006 371 A1, corresponding to U.S. Patent Application Publication No. 2015/0042716.

In accordance with a first preferred further development of the invention, a provision is made for the solvent-free cleaning agent initially to be applied to an impermeable flexible carrier medium such as a plastic foil. Subsequently, the carrier medium carrying the cleaning agent is applied to a region to be treated of a layer of ink on a surface. After a residence time of approximately three minutes, the carrier medium is removed. Then the process continues as described above. A particular advantage of this process is that the shape of the area to be removed may be precisely defined and the amount of cleaning agent is adapted to the area to be removed in an optimum way.

In accordance with a further embodiment of the invention, a provision is made for the cleaning agent to be applied directly to the adhesive film and to be applied to the surface or area to be treated together with the adhesive film. This accelerates the cleaning process because the application of the cleaning agent to a first foil and the application and removal of a first foil are dispensed with.

In accordance with a further embodiment of the invention, a provision is made for the cleaning agent to be provided in capsules disposed on the adhesive side of the adhesive film. When the adhesive film is applied to the layer of ink to be treated, the capsules open due to the pressing force to release the cleaning agent, which then disperses between the adhesive element and the layer of ink. If the cleaning agent is applied directly on the foil, it is in danger of running off, causing loss of cleaning agent and increasing the cleaning effort required to clean the work environment. Providing cleaning agent in capsules additionally improves storage stability and prolongs shelf life. The advantageous use of capsules prevents the cleaning agent from running off and allows accurate metering of the applied amount of cleaning agent.

In accordance with an advantageous further embodiment of the invention, a provision is made for the cleaning agent to be applied to the surface using an inkjet head. This allows the accuracy of the application onto the area to be treated and the metering of the applied amount of cleaning agent to be even further optimized. Moreover, the process may be exactly repeated due to the use of an inkjet. Alternatively, the cleaning agent may be applied by a spray head, for instance by a so-called airbrush device.

In accordance with a further advantageous embodiment, a provision is made for the cleaning agent to be applied only to edge regions of the area to be removed of the layer of ink. In the edge regions, the undermining of the layer of ink is most effective. This allows the amount of cleaning agent being used to be reduced.

In accordance with a further embodiment, a provision is made for excess applied cleaning agent to be removed from the layer of ink using a liquid-absorbent cloth. This improves adhesion between the layer of ink to be removed and the adhesive film because there is no undesired layer of cleaning agent between the adhesive layer and the layer of ink.

In accordance with an advantageous further embodiment, after the excess cleaning agent has been removed from the layer of ink using a liquid-absorbent cloth, the surface area that has been treated with cleaning agent is rinsed with water and subsequently dried to further optimize adhesion between the adhesive film and the layer of ink because the rinsing and subsequent drying removes all adhesion-reducing liquid residues on the layer of ink.

In accordance with an advantageous further embodiment of the invention, a provision is made for the solvent-free cleaning agent to be a gel.

In a further embodiment, the layer of ink to be removed is a layer of ink that has been cured using UV light and had preferably been applied in an inkjet printing process.

In accordance with an advantageous further embodiment, the layer of ink to be removed is a thermally cured layer of ink, which may also have been created in an inkjet process. Alternatively, an oxidatively-curing ink may be used.

Other features which are considered as characteristic for the invention are set forth in the appended claims.

Although the invention is illustrated and described herein as embodied in a method for removing solidified ink or varnish using adhesive strips, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
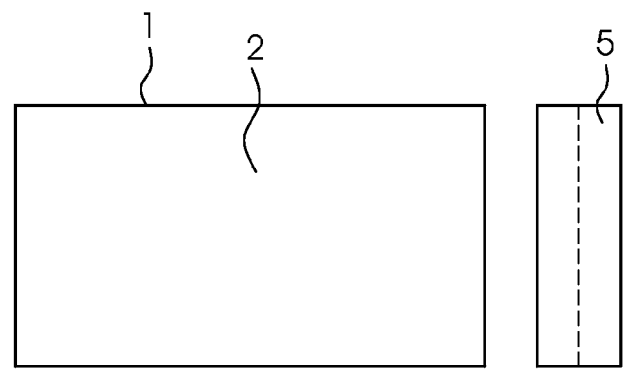
FIG. 1 is a diagrammatic, plan view of a surface covered by a UV-cured layer of ink.
Figure 2:
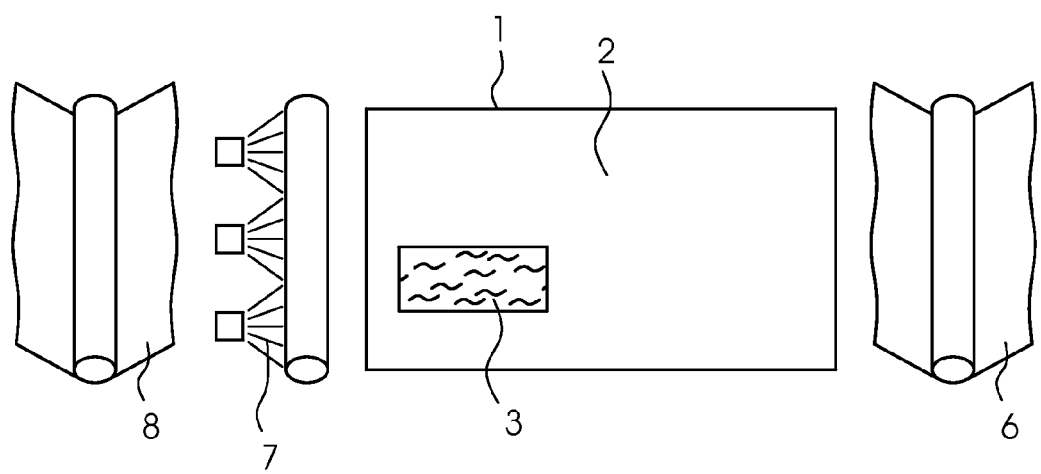
FIG. 2 is a plan view of the same surface having areas to which a cleaning agent has been applied.
Figure 3:
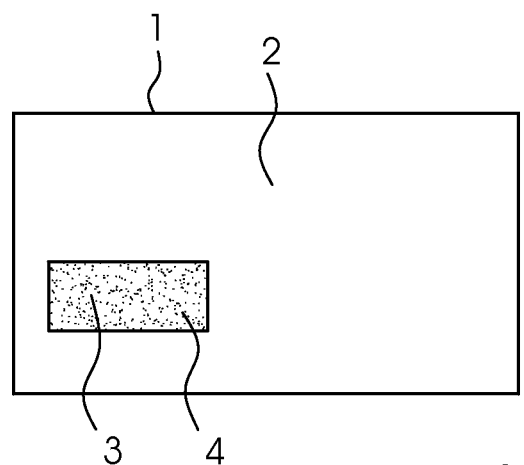
FIG. 3 is a plan view of the same surface with an adhesive film applied to the areas that have been treated with cleaning agent.
Figure 4:
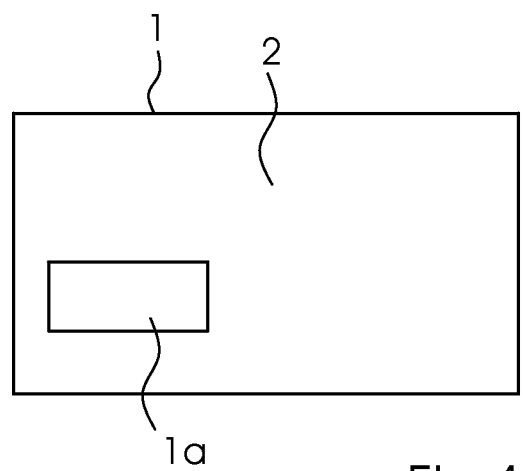
FIG. 4 is a plan view of the same surface after the adhesive film has been removed.

Referring now to the figures of the drawings in detail and first, particularly, to FIG. 1 thereof, there is seen a surface 1 covered by a UV-cured layer of ink 2. An inkjet head 5 applies a solvent-free cleaning agent 3 to a part of the surface 1. The cleaning agent 3 reduces adhesion of the UV-cured layer of ink 2 to the surface 1 without dissolving the layer of ink 2. FIG. 2 illustrates the surface 1 with the applied cleaning agent 3. After a residence time of approximately three minutes, excess cleaning agent 3 is removed by using a liquid-absorbent cloth 6. The surface part that has been treated with cleaning agent 3 is rinsed with water 7 and dried, for instance by using a cloth 8 or a blower. After the drying step, an adhesive film 4 is applied to the surface part that has been treated with cleaning agent 3 as shown in FIG. 3. This adhesive film 4 is removed immediately after application to the surface 1. The ink 2 that has been treated with the cleaning agent 3 adheres to the adhesive film 4 and is removed from the surface 1 together with the adhesive film 4. FIG. 4 illustrates the surface 1 or an area 1a thereof that has been partially freed of UV-cured ink 2 in accordance with the present method.

The invention claimed is:

1. A method for removing ink from a surface of an object, the method comprising the following steps:
    applying a cleaning agent to treat a solidified layer of ink on the surface, the cleaning agent applied to the solidified layer of ink on the surface being substantially solvent-free and water-based, permeating the solidified layer of ink and reducing adhesion of the solidified layer of ink to the surface without dissolving the solidified layer of ink;
    applying an adhesive side of a one-sided adhesive element to the treated solidified layer of ink on the surface; and
    removing the adhesive element from the surface together with substantially entire treated solidified layer of ink adhering to the adhesive element, causing the entire treated solidified layer of ink adhering to the adhesive element and having been treated with the cleaning agent but being substantially undissolved to adhere to the adhesive element without splitting.

2. The method according to claim 1, which further comprises:
    initially applying the cleaning agent to an impermeable flexible carrier medium;

applying the carrier medium with the cleaning agent to the surface to be treated; and removing the carrier medium from the surface, leaving a thin film of the cleaning agent on the surface.

3. The method according to claim 1, which further comprises applying the cleaning agent directly to the adhesive element and applying the cleaning agent to the surface together with the adhesive element.

4. The method according to claim 1, which further comprises:

provinding the cleaning agent in capsules disposed on the adhesive element;

opening the capsules as the adhesive element is pressed onto the surface; and releasing and dispersing the cleaning agent between the adhesive element and the surface.

5. The method according to claim 1, which further comprises applying the cleaning agent to the surface using an inkjet head.

6. The method according to claim 1, which further comprises applying the cleaning agent only to edge regions of an area of the surface covered with solidified ink.

7. The method according to claim 1, which further comprises removing excess cleaning agent using a liquid-absorbent cloth.

8. The method according to claim 7, which further comprises rinsing with water and subsequently drying a part of the surface having been treated with the cleaning agent.

9. The method according to claim 1, wherein the cleaning agent is a gel.

10. The method according to claim 1, wherein the ink to be removed is a layer of ink having been cured by UV light.

11. The method according to claim 1, wherein the ink to be removed is a layer of ink having been cured thermally or oxidatively.

* * * * *